US011106428B2

(12) United States Patent
Eswaran et al.

(10) Patent No.: US 11,106,428 B2
(45) Date of Patent: Aug. 31, 2021

(54) METHOD AND SYSTEM FOR MANAGING CROWD-SENSED DATA

(71) Applicant: Conduent Business Services, LLC, Dallas, TX (US)

(72) Inventors: Sharanya Eswaran, Bangalore (IN); Deepthi Chander, Cochin (IN); Mridula Singh, Uttar Pradesh (IN); Tridib Mukherjee, Bangalore (IN); Koustuv Dasgupta, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 568 days.

(21) Appl. No.: 15/335,498

(22) Filed: Oct. 27, 2016

(65) Prior Publication Data

US 2018/0121548 A1    May 3, 2018

(51) Int. Cl.
*G06F 7/24*        (2006.01)
(52) U.S. Cl.
CPC ..................................... *G06F 7/24* (2013.01)
(58) Field of Classification Search
None
See application file for complete search history.

(56) References Cited

U.S. PATENT DOCUMENTS

| 8,527,431 | B2 | 9/2013 | Bhattacharjee | |
| 2006/0167784 | A1* | 7/2006 | Hoffberg | G06Q 50/188 |
| | | | | 705/37 |
| 2008/0154829 | A1* | 6/2008 | Dalton | G06K 9/00785 |
| | | | | 706/46 |
| 2011/0191284 | A1* | 8/2011 | Dalton | G06N 5/02 |
| | | | | 706/58 |
| 2012/0284090 | A1 | 11/2012 | Marins et al. | |
| 2014/0365571 | A1 | 12/2014 | Agarwal et al. | |

(Continued)

FOREIGN PATENT DOCUMENTS

WO    WO 2014097164 A1    6/2014

OTHER PUBLICATIONS

Yan, T., et al.: CrowdPark: A Crowdsourcing-based Parking Reservation System for Mobile Phones. UMASS Technical Report, Tech. Rep. UM-CS-2011-001 (2011).

(Continued)

*Primary Examiner* — Christopher J Raab
(74) *Attorney, Agent, or Firm* — Jones Robb, PLLC

(57) ABSTRACT

The disclosed embodiments illustrate a method and a system for managing crowd-sensed data, associated with events occurring in a geographical area. The method includes receiving crowd-sensed data from one or more data sources, wherein the crowd-sensed data comprises one or more event reports associated with at least a type of each of one or more events reported by the one or more data sources. The method further includes generating a data structure based on an aggregation of the received crowd-sensed data. Further, the method includes determining first information and second information based on at least the generated data structure, a reputation score of each of the one or more data sources and metadata associated with each of the one or more event reports. The method further includes displaying at least the determined first information and second information based on at least a prioritization of the one or more events.

27 Claims, 4 Drawing Sheets

(56) References Cited

U.S. PATENT DOCUMENTS

| | | | | |
|---|---|---|---|---|
| 2015/0285639 A1* | 10/2015 | Basalamah | ........... | H04W 4/023 |
| | | | | 455/456.3 |
| 2015/0325102 A1* | 11/2015 | Mondal | ................... | H04L 67/04 |
| | | | | 340/539.11 |
| 2016/0104071 A1* | 4/2016 | Brueckner | ............. | G06N 7/005 |
| | | | | 706/52 |
| 2016/0239024 A1* | 8/2016 | Fletcher | ................. | G06Q 10/00 |
| 2017/0004213 A1* | 1/2017 | Cunico | ................... | H04W 4/90 |
| 2017/0230724 A1* | 8/2017 | Goslin | .............. | H04N 21/4826 |
| 2018/0070298 A1* | 3/2018 | Kothari | ................. | H04W 48/18 |
| 2018/0081499 A1* | 3/2018 | Chugh | ................ | G06F 16/9537 |

OTHER PUBLICATIONS

Dua, Akshay, et al. "Combating software and Sybil attacks to data integrity in crowd-sourced embedded systems." ACM Transactions on Embedded Computing Systems (TECS) 13.5s (2014): 154.

Dong Wang, Tarek Abdelzaher, Lance Kaplan and Raghu Ganti. "Exploitation of Physical Constraints for Reliable Social Sensing," IEEE 34th Real-Time Systems Symposium (RTSS'13) Vancouver, Canada, Dec. 2013.

Stefan Saroiu and Alec Wolman, "I Am a Sensor, and I Approve this Message", Hotmobile 2010.

Talasila, Manoop, Reza Curtmola, and Cristian Borcea. "Improving location reliability in crowd sensed data with minimal efforts." Wireless and Mobile Networking Conference (WMNC), 2013 6th Joint IFIP. IEEE, 2013.

Dong Wang, Lance Kaplan, Tarek Abdelzaher and Charu C. Aggarwal. "On Credibility Tradeoffs in Assured Social Sensing." IEEE JSAC special issue on Network Science, June, vol. 31, No. 6, 2013.

Huang, Kuan Lun, Salil S. Kanhere, and Wen Hu. "On the need for a reputation system in mobile phone based sensing." Ad Hoc Networks 12 (2014): 130-149.

Dong Wang, Lance Kaplan, Hieu Le, and Tarek Abdelzaher. "On Truth Discovery in Social Sensing: A Maximum Likelihood Estimation Approach." The 11th ACM/IEEE Conference on Information Processing in Sensor Networks (IPSN 12). Beijing, China Apr. 2012.

Dong Wang, Lance Kaplan and Tarek Abdelzaher. "On Truth Discovery in Social Sensing with Conflicting Observations: A Maximum Likelihood Estimation Approach." ACM Transaction on Sensor Networks (TOSN), in press, 2013.

Dua, Akshay, et al. "Towards trustworthy participatory sensing." Proceedings of the 4th USENIX conference on Hot topics in security. USENIX Association, 2009.

Dong Wang , Tanvir Amin, Shen Li, Tarek Abdelzaher, Lance Kaplan, Siyu Gu, Chenji Pan, Hengchang Liu, Charu Aggrawal, Raghu Ganti, XinLei Wang, Prasant Mohapatra, Boleslaw Szymanski, Hieu Le, "Humans as Sensors: An Estimation Theoretic Perspective," The 13th ACM/IEEE International Conference on Information Processing in Sensor Networks (IPSN 14), Berlin, Germany, Apr. 2014.

* cited by examiner

METHOD AND SYSTEM FOR MANAGING CROWD-SENSED DATA

TECHNICAL FIELD

The presently disclosed embodiments are related, in general, to data management. More particularly, the presently disclosed embodiments are related to a method and a system for managing crowd-sensed data associated with one or more events in a geographical area.

BACKGROUND

Over the past decade, the usage of advanced handheld devices, equipped with sensing, computing, and networking capabilities, has become widespread, leading to the emergence of participatory sensing. In participatory sensing, both the mobility of participants and the sensing capabilities of their handheld devices may be exploited to construct incidental scenarios and predict related events. The participants may capture data sensed from their surroundings through a variety of sensors embedded in their handheld devices. The sensed data may be shared across a common platform and used to predict multi-fold events and their consequences.

Such sensed data may be utilized by various applications to serve various requirements, such as to report and predict events. In certain scenarios, the sensed data may not be reliable as the participants may submit a report of a wrong event, wrong occurrence time of the event, delayed report of the event, wrong place of occurrence, and/or the like. Thus, the veracity of crowd-sensed data in a participatory sensing system is required to be validated. Therefore, solutions that take vital parameters, such as participants' preferences, into consideration while authenticating data management are required.

Further limitations and disadvantages of conventional and traditional approaches will become apparent to one skilled in the art, through a comparison of described systems with some aspects of the present disclosure, as set forth in the remainder of the present application and with reference to the drawings.

SUMMARY

According to embodiments illustrated herein, there is provided a method for management of crowd-sensed data associated with events occurring in a geographical area. The method includes receiving, by one or more transceivers at the computing device, the crowd-sensed data from one or more data sources, wherein the crowd-sensed data comprises one or more event reports associated with at least a type of each of one or more events reported by the one or more data sources. The method further includes generating, by one or more processors at the computing device, a data structure based on an aggregation of received crowd-sensed data. The method further includes determining, by the one or more processors at the computing device, first information and second information based on at least the generated data structure, a reputation score associated with each of the one or more data sources and metadata associated with each of the one or more event reports. The method further includes displaying, by the one or more processors at the computing device, at least the determined first information and the determined second information through a user interface displayed on a display screen of a requestor-computing device based on at least a prioritization of the one or more events.

According to embodiments illustrated herein, there is provided a system for management of crowd-sensed data associated with events occurring in a geographical area. The system includes one or more transceivers at a computing device configured to receive the crowd-sensed data from one or more data sources, wherein the crowd-sensed data comprises one or more event reports associated with at least a type of each of one or more events reported by the one or more data sources. The system includes one or more processors configured to generate a data structure based on an aggregation of the received crowd-sensed data. The one or more processors are further configured to determine first information and second information based on at least the generated data structure, a reputation score associated with each of the one or more data sources and metadata associated with each of the one or more event reports. Furthermore, the one or more processors are configured to display at least the determined first information and the determined second information through a user interface displayed on a display screen of the requestor-computing device based on at least a prioritization of the one or more events.

According to embodiments illustrated herein, there is provided a computer program product for use with a computer. The computer program product includes a non-transitory computer readable medium. The non-transitory computer readable medium stores a computer program code for managing crowd-sensed data, associated with events occurring in a geographical area, at a computing device. The computer program code is executable to receive the crowd-sensed data from one or more data sources, wherein the crowd-sensed data comprises one or more event reports associated with at least a type of each of one or more events reported by the one or more data sources. The computer program code is further executable to generate a data structure based on an aggregation of the received crowd-sensed data. The computer program code is executable determine first information and second information based on at least the generated data structure, a reputation score associated with each of the one or more data sources and metadata associated with each of the one or more event reports. The computer program code is further executable to display at least the determined first information and the determined second information through a user interface displayed on a display screen of the requestor-computing device based on at least a prioritization of each of the one or more events.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
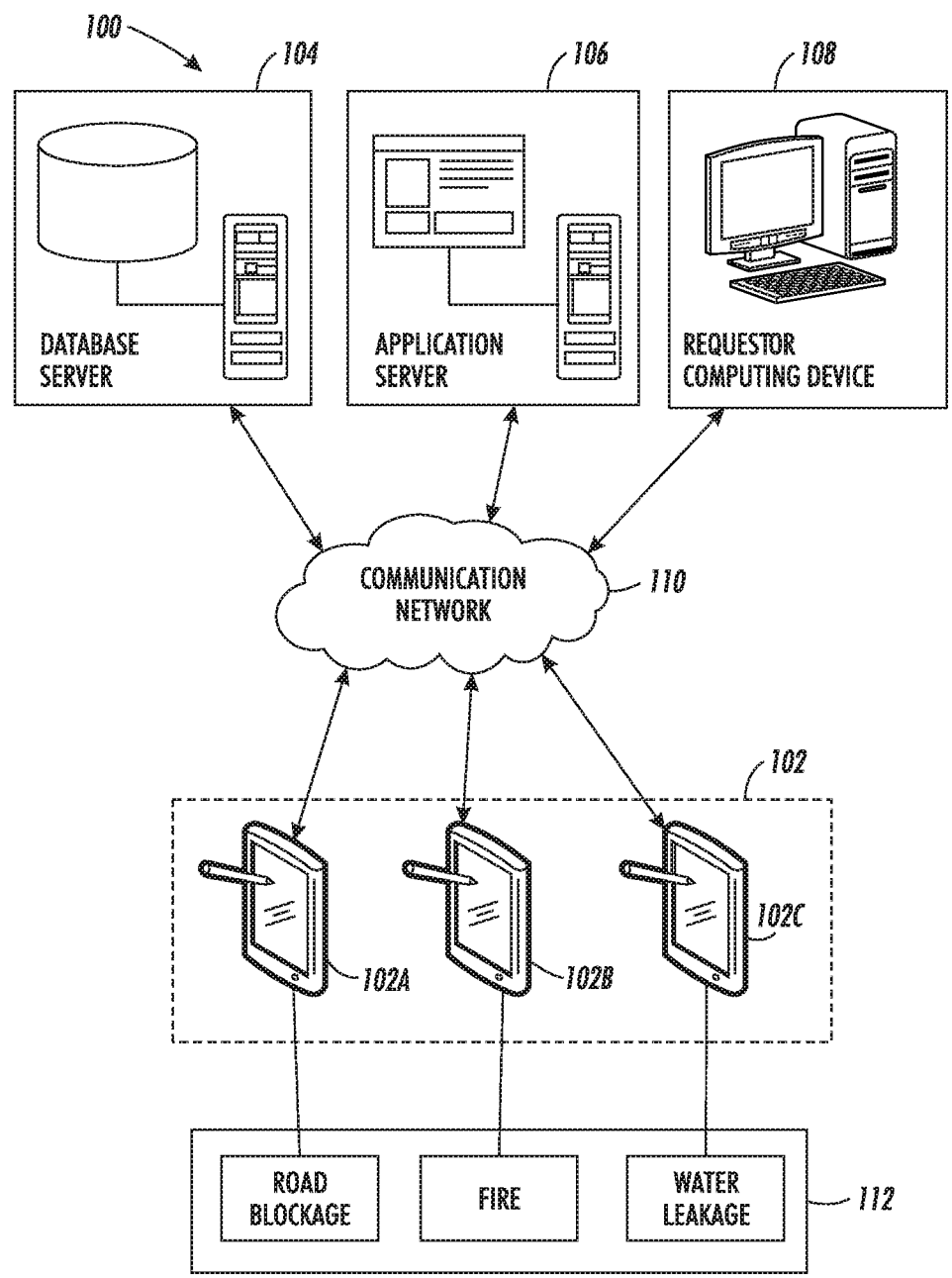
FIG. 1 is a block diagram that illustrates a system environment in which various embodiments may be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment," "an embodiment," "at least one embodiment," "one example," "an example," "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions

The following terms shall have, for the purposes of this application, the respective meanings set forth below.

A "computing device" refers to a device that includes one or more processors/microcontrollers and/or any other electronic components, or a device or a system, which performs one or more operations according to one or more programming instructions/codes. Examples of a computing device may include, but are not limited to, a desktop computer, a laptop, a personal digital assistant (PDA), a mobile device, a smartphone, and a tablet computer (e.g., iPad® and Samsung Galaxy Tab®).

"Crowd-sensed data" refers to data that has been collected from one or more users associated with one or more data sources. Crowd-sensed data comprises one or more event reports posted by the one or more users on the one or more data sources. For example, the one or more users may have observed the occurrence of an event in a geographical area. The one or more users may have recorded the event and accordingly reported the event. Such reporting of the event by the one or more users may correspond to crowd-sensed data. Further, crowd-sensed data may comprise one or more electronic messages posted, shared, liked, or disliked by one or more users pertaining to each of the one or more events.

A "requestor" refers to an individual who may have requested to view information pertaining to one or more events that are reported by one or more users on one or more data sources. In an embodiment, the requestor may correspond to a police officer, a reporter, a hospital in-charge, a fire safety officer, and/or the like.

A "user" refers to an individual who reports information pertaining to one or more events through his/her computing device. In an embodiment, the user may have registered on one or more websites for reporting the information pertaining to the one or more events. In an embodiment, the user may report information (i.e., an event report) pertaining to any event that he/she has noticed in his/her vicinity. The reported information may correspond to crowd-sensed data associated with the corresponding event. The term "user" has been interchangeably used with "resident," "citizen," or "individual" hereinafter.

A "geographical area" refers to a location, such as a region, a country, a state, a city, a town, a village, a district, or a locality. In an embodiment, the location may be associated with the place of an occurrence of an event.

An "event" refers to an activity that occurs at a specific time at a specific location and involves one or more individuals. Examples of various types of events include, but are not limited to, a fire event, traffic congestion, an accident, a building disaster, or water leakage.

"Data structure" refers to the grouping of data in a specific format for storage or further processing. In an embodiment, the data structure may be generated based on the aggregation of received crowd-sensed data. In an embodiment, the count of rows in the data structure may be determined based on the count of the one or more data sources and the count of columns in the data structure may be determined based on the number of types of each of the one or more events. For example, crowd-sensed data (i.e., 100 event reports) pertaining to four types of events may be received from five data sources. In this scenario, the data structure comprises five rows and four columns. Further, the event reports associated with common event types are grouped together in the data structure. In an embodiment, a score pertaining to each cell, which corresponds to a specific data source represented by a row and a specific event represented by a column, in the data structure is determined based on the reputation score of the specific data source and the number of times the specific event in each of the one or more events is reported by one or more users on the one or more data sources.

An "aggregation" refers to the technique of combining information received from one or more data sources. In an embodiment, the information may correspond to one or more event reports posted by one or more users on the one or more data sources. In an embodiment, the aggregated information represents a consolidated report of the one or more event reports extracted from the one or more data sources. In an embodiment, the information may be aggregated based on location, time, type of the event associated with each of the one or more event reports, and content of the one or more event reports. In an embodiment, one or more aggregation algorithms may be utilized to aggregate the information. For example, the information (i.e., the one or more event reports) from the one or more users pertaining to a common type of event may be grouped together. Thus, the aggregated information may comprise one or more groups of information pertaining to a type of the one or more events.

"First information" refers to collective information that may correspond to the likelihood of the occurrence of each of the one or more events. In an embodiment, the first information may be determined based on one or more preferences of a requestor for each of the one or more events and/or the likelihood of occurrence of the one or more other events due to the occurrence of each of the one or more events.

"Second information" corresponds to a data source reliability score that indicates the reliability of each of the one or more data sources that may report one or more events in a geographical area. In an embodiment, the data source reliability score may be determined based on the reporting time stamp associated with each of the one or more events, a criticality score associated with each of the reported one or more events, and a pre-determined category of the one or more data sources.

A "reputation score" refers to the score of each of the one or more data sources that may be determined based on at least the one or more event reports extracted from the corresponding data sources, the veracity of each of the one or more event reports, the reporting time stamp associated with each of the one or more event reports, and the criticality score associated with each of the one or more events.

"Metadata" refers to additional information provided by one or more users along with one or more event reports. In an embodiment, the additional information may include, but is not limited to, the occurrence time stamp associated with each of the one or more event reports, the geographical location associated with each of the one or more event reports, and the criticality score associated with each of the one or more events.

An "occurrence time stamp" refers to the time instance associated with the occurrence of an event in a geographical area. In an embodiment, the occurrence time stamp may be in real time, i.e., when the event in the geographical area may have occurred. For example, a user may post an event report at "2:15 pm" on a data source pertaining to a "fire accident" that occurred at a location "A" at "2:00 pm." In this scenario, "2:00 pm" corresponds to the occurrence time stamp associated with the event "fire accident."

A "reporting time stamp" refers to the time instance at which a user reports the occurrence of an event in a geographical area. In an embodiment, the reporting time stamp may be associated with each of the reported one or more events by one or more sources. Further, the reporting time stamp may follow the occurrence time stamp associated with the one or more events. For example, a user may post a report at "2:15 pm" on a data source pertaining to a "fire accident" that occurred at a location "A" at "2:00 pm." In this scenario, "2:15 pm" corresponds to the reporting time stamp associated with the event "fire accident."

A "criticality score" refers to a score that may be indicative of the importance associated with an event. A criticality score may be determined based on historical data associated with each of the one or more events in a geographical area. In an embodiment, the criticality score may be dynamically updated based on the one or more event reports and the historical data associated with the one or more events. Further, in an embodiment, the criticality score may be determined based on generated data structure.

"Historical data" comprises information pertaining to one or more previous events. In an embodiment, historical data may comprise one or more event reports pertaining to the one or more previously occurred events. Further, historical data comprises metadata pertaining to the one or more event reports of the one or more previous events in a geographical area. In an embodiment, historical data may be utilized to determine the initial reputation score of each of the one or more data sources. In an embodiment, historical data may be further utilized to determine the relationship between the one or more events and the one or more other events. The one or more other events occur as a result of the occurrence of the one or more events.

"One or more data sources" refer to one or more platforms where one or more users may post share, like, or dislike information pertaining to one or more events. Examples of the one or more data sources may include, but are not limited to, mobile apps, webpages, and social media pages.

"One or more preferences" refer to one or more inputs provided by a requestor in a request. In an embodiment, the one or more preferences of the requestor may include a set of pre-determined tags from the one or more pre-determined tags associated with one or more events, a set of data sources from one or more data sources, and/or a location of interest.

"One or more pre-determined tags" associated with the one or more event reports are indicative of the type of event associated with each of the one or more event reports. For example, the pre-determined tag "accident" may be associated with an event report that may indicate a type of the event "road accident."

FIG. 1 is a block diagram of a system environment in which various embodiments may be implemented. FIG. 1 contains a system environment 100 that includes user-computing devices 102A, 102B, and 102C (hereinafter, collectively referred to as one or more user-computing devices 102), a database server 104, an application server 106, a requestor-computing device 108, and a communication network 110. There is further shown one or more events 112. Various devices in the system environment 100 may be interconnected over the communication network 110. FIG. 1 shows, for simplicity, three user-computing devices—102A, 102B, and 102C, one database server, such as the database server 104, one application server, such as the application server 106, and one requestor-computing device, such as the requestor-computing device 108. However, it will be apparent to a person having ordinary skill in the art that the disclosed embodiments may also be implemented using multiple user-computing devices, multiple database servers, multiple applications servers, and multiple requestor-computing devices, without deviating from the scope of the disclosure.

Each of the one or more user-computing devices 102 corresponds to a mobile computing device that is usable by each of one or more users. In an embodiment, the one or more users may utilize the one or more user-computing devices 102 for reporting the one or more events 112 on one or more data sources. In an embodiment, the event may correspond to an activity that may have occurred at a specific time at a specific location and involves one or more individuals. Examples of the event include traffic congestion, fire accidents, water leakage, and/or the like. Each of the one or more user-computing devices 102 may include one or more sensors such as, but not limited to, a camera, audio recorder, and a video recorder. Further, the one or more sensors may be configured to record, capture, and/or sense data pertaining to the one or more events 112.

In an embodiment, the one or more user-computing devices 102 may be utilized by the one or more users to post (share, like, and/or dislike) the recorded, captured, and/or sensed data on the one or more data sources. In an embodiment, the recorded, captured, and/or sensed data may comprise the occurrence time stamp and geographical area associated with each of the one or more events 112. In an embodiment, the occurrence time stamp may correspond to the time of occurrence of the event at a geographical location in the geographical area. Further, when a user posts (shares, likes, and/or dislikes) data on the one or more data sources, a reporting time stamp is associated with the posted data. In an embodiment, the one or more users may further associate a criticality score with each of the one or more event reports, based on the criticality of the corresponding one or more events 112. In another embodiment, the criticality score may be determined based on historical data stored in the database server 104. In an embodiment, the occurrence time stamp, the geographical area, and the criticality score associated with an event of the one or more events 112 may, collectively, correspond to the metadata of the corresponding event. The posted (shared, liked, and/or disliked) data pertaining to the one or more events 112 may correspond to one or more event reports. The one or more event reports on the one or more data sources are, collectively, referred to as crowd-sensed data.

In another embodiment, while posting the one or more event reports on the one or more data sources, the one or more users may further provide one or more inputs pertaining to a description of the one or more events 112. The one or more inputs, provided by the one or more users, pertaining to the description of the one or more events 112, may correspond to the content of the one or more event reports. In an embodiment, the one or more users may provide the one or more inputs by utilizing a user interface displayed on each of the one or more user-computing devices 102.

Examples of the one or more user-computing devices 102 may include, but are not limited to, a desktop, a laptop, a personal digital assistant (PDA), and a tablet computer.

The database server 104 may refer to a computing device that may be communicatively coupled to the communication network 110. In an embodiment, the database server 104 may be configured to store the historical data pertaining to one or more previous events. In an embodiment, the historical data may comprise one or more event reports pertaining to the one or more previous events. The historical data may further comprise metadata pertaining to the one or more event reports on the one or more previous events in a geographical area. This metadata may comprise the occurrence time stamp, the geographical location, and the criticality score associated with each of the one or more previous events.

In an embodiment, the database server 104 may extract the historical data from various sources such as, but not limited to, the databases of various government organizations, which may provide rightful authentication to access the information pertaining to the one or more previous events.

In an embodiment, the database server 104 may receive a query from the requestor-computing device 108 and/or the application server 106 for the retrieval of the historical data. Based on the received query, the database server 104 may be configured to transmit and/or receive historical data to the requestor-computing device 108 and/or the application server 106, over the communication network 110. For querying the database server 104, one or more querying languages may be utilized such as, but not limited to, structured query language (SQL), relational database query language (QUEL), and data mining extensions (DMX). Further, the database server 104 may be realized through various technologies such as, but not limited to, Microsoft® SQL server, Oracle®, and My SQL.

The application server 106 may refer to an electronic device, a computing device, or a software framework hosting an application or a software service that may be communicatively coupled to the communication network 110. In an embodiment, the function of the application server 106 may be dedicated to the efficient execution of procedures, such as, but not limited to, programs, routines, or scripts stored in one or more memories for supporting hosted applications or software service.

In an embodiment, the application server 106 may be configured to receive crowd-sensed data pertaining to the one or more events 112 from the one or more data sources. In an embodiment, the received crowd-sensed data comprises the one or more event reports extracted from the one or more data sources. Further, each of the one or more event reports is associated with a type of event reported by the one or more data sources. For example, an event report, such as "A fire accident took place at Madison Avenue at 10:00 am," extracted from a data source, such as "Mycity," may be associated with a type of event "Fire" reported by the data source "Mycity." Further, a pre-determined tag may be associated with each of the one or more event reports pertaining to the type of each of the one or more events 112.

In an embodiment, each of the one or more event reports in the received crowd-sensed data may be associated with corresponding metadata. In an embodiment, the metadata may include at least the occurrence time stamp, the geographical location, and the criticality score associated with each of the one or more events 112. In an embodiment, the application server 106 may be configured to determine the type of event associated with each of the one or more event reports in the received crowd-sensed data based on the corresponding metadata, the pre-determined tag, and the content of each of the one or more event reports.

In an embodiment, the application server 106 may be further configured to aggregate the received crowd-sensed data. The application server 106 may aggregate the received crowd-sensed data based on at least the reporting time stamp and the geographical location associated with each of the one or more event reports in the crowd-sensed data. In an embodiment, the application server 106 may be configured to generate a data structure based on the aggregation of the received crowd-sensed data. In the data structure, the one or more event reports associated with a common type of event are grouped together. For example, the crowd-sensed data may comprise 50 event reports. Of the 50 event reports, 15 event reports are associated with a "fire accident at Madison avenue at 10:00 am on Aug. 21, 2015," 17 event reports are associated with a "traffic jam at East Harlem at 1:00 pm on Aug. 22, 2015," and 12 event reports are associated with a "road accident at East Harlem at 12:45 pm on Aug. 22, 2015." In this scenario, the 15 event reports that are associated with the "fire accident" are grouped together. Similarly, the 17 event reports that are associated with the "traffic jam" are grouped together, and so are the 12 event reports that are associated with the "road accident." In an embodiment, the application server 106 may utilize the type of event associated with each of the one or more event reports for grouping event reports during aggregation.

In an embodiment, the application server 106 may be further configured to determine a reputation score for each of the one or more data sources from which the crowd-sensed data is received. The application server 106 may determine the reputation score for each of the one or more data sources based on at least the one or more event reports on each of the one or more data sources, a veracity associated with each of the one or more event reports, the reporting time stamp associated with each of the one or more event reports, and the criticality score associated with each of the one or more event reports. Thereafter, the application server 106 may be configured to determine first information and second information based the data structure, the reputation score associated with each of the one or more data sources, and the metadata associated with each of the one or more event reports.

In an embodiment, the first information may correspond to the likelihood of an occurrence of each of the one or more events 112 associated with the one or more event reports. In an embodiment, the application server 106 may further utilize the likelihood of occurrence of the one or more other events that occur as a result of the occurrence of each of the one or more events 112 for the determination of the first information and the second information. In an embodiment, the second information may correspond to a data source reliability score. The data source reliability score is indicative of the reliability of a data source of the one or more data sources. In an embodiment, the application server 106 may determine the data source reliability score for a data source based on the reporting time stamp associated with each of the one or more event reports, the criticality score associated with each of the one or more event reports, and a pre-determined category of the one or more data sources.

In an embodiment, the application server 106 may be further configured to receive a request, for viewing the first information and the second information, from a requestor-computing device 108 associated with a requestor. Thereafter, based on the received request, the application server 106 may be configured to display the first information and the second information on the display screen of the requestor-computing device 108, through a user interface. In an embodiment, the application server 106 may further display the reputation score and the likelihood of occurrence of the one or more other events on the display screen of the requestor-computing device 108, through the user interface.

In an embodiment, prior to the display of the first information and the second information, the application server 106 may be configured to update the first information and the second information based on the received request from the requestor-computing device 108. In an embodiment, the application server 106 may be configured to prioritize the first information and the second information based on the received request from the requestor-computing device 108. In another embodiment, the application server 106 may be configured to prioritize the first information and the second information based on the criticality score associated with each of the one or more event reports. Thereafter, the application server 106 may be configured to display the first information and the second information in the prioritized order on the requestor-computing device 108.

In an embodiment, the application server 106 may be realized through various types of servers such as, but not limited to, Java server, .NET framework, and Base4 server. An embodiment of the structure of the application server 106 has been described later in FIG. 2.

A person skilled in the art will understand that the scope of the disclosure is not limited to the implementation of the database server 104 and the application server 106 as separate entities. In an embodiment, the functionalities of the database server 104 and the application server 106 may be combined into a single server, without deviating from the scope of the disclosure.

The requestor-computing device 108 refers to a computing device that may comprise one or more processors in communication with one or more memories. The requestor-computing device 108 may be operable to execute one or more sets of instructions stored in the one or more memories. In an embodiment, the requestor-computing device 108 may be communicatively coupled to the communication network 110.

In an embodiment, the requestor may utilize the requestor-computing device 108 to transmit a request for viewing the first information and the second information to the application server 106. In an embodiment, the requestor may provide a set of pre-determined tags from the one or more pre-determined tags associated with the type of one or more events. For example, a requestor, who is a traffic in-charge, may only be interested in traffic-related events. Thus, the requestor may provide a set of pre-determined tags, such as "traffic jams," "road accident," "road construction," and/or the like, associated with the type of traffic-related events. In an embodiment, the requestor may further provide a set of data sources, from the one or more data sources in the request, from which the requestor may want to view the first information and the second information.

Thereafter, based on the request, the requestor-computing device 108 may receive the first information, the second information, the reputation score, and the likelihood of the one or more other events from the application server 106, over the communication network 110. Further, the requestor may utilize the requestor-computing device 108 to view the first information, the second information, the reputation score, and the likelihood of the one or more other events, through the user interface.

The requestor-computing device 108 may correspond to various types of computing devices, such as, but not limited to, a desktop computer, a laptop, a personal digital assistant (PDA), a mobile device, a smartphone, and a tablet computer (e.g., iPad® and Samsung Galaxy Tab®).

The communication network 110 corresponds to a medium through which requests, content, and messages flow between various devices, such as the one or more user-computing devices 102, the database server 104, the application server 106, and the requestor-computing device 108, of the system environment 100. Examples of the communication network 110 may include, but are not limited to, a Wireless Fidelity (Wi-Fi) network, a Wide Area Network (WAN), a Local Area Network (LAN), or a Metropolitan Area Network (MAN). Various devices in the system environment 100 can be connected to the communication network 110 in accordance with various wired and wireless communication protocols, such as Transmission Control Protocol/Internet Protocol (TCP/IP), User Datagram Protocol (UDP), and 2G, 3G, or 4G communication protocols.

Figure 2:
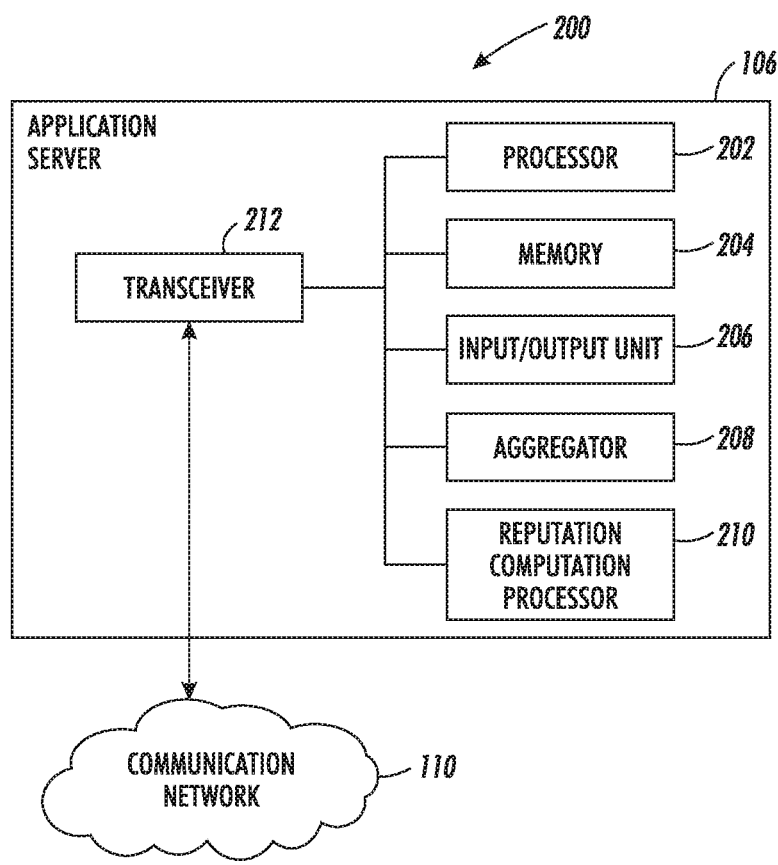
FIG. 2 is a block diagram that illustrates a system for managing crowd-sensed data, associated with events occurring in a geographical area, in accordance with at least one embodiment.

FIG. 2 is a block diagram of a system for managing crowd-sensed data, associated with events occurring in a geographical area, in accordance with at least one embodiment. FIG. 2 has been described in conjunction with FIG. 1. FIG. 2 contains a system 200 that may include one or more processors, such as a processor 202, one or more memories, such as a memory 204, an input/output (I/O) unit 206, one or more aggregators, such as an aggregator 208, one or more reputation computation processors, such as a reputation computation processor 210, and one or more transceivers, such as a transceiver 212. The system 200 may correspond to the application server 106 or the requestor-computing device 108, without departing from the scope of the disclosure. For the purpose of the ongoing description, the system 200 corresponds to the application server 106.

The processor 202 may be configured to execute a set of instructions stored in the memory 204 to perform one or more operations. The processor 202 may be coupled to the memory 204, the I/O unit 206, the aggregator 208, the reputation computation processor 210, and the transceiver

212. The processor 202 may be implemented based on a number of processor technologies known in the art. Examples of the processor 202 may include, but are not limited to, an X86-based processor, a Reduced Instruction Set Computing (RISC) processor, an Application-Specific Integrated Circuit (ASIC) processor, and/or a Complex Instruction Set Computing (CISC) processor. The processor 202 may comprise one or more arithmetic logic units such as an arithmetic logic unit (ALU) and one or more control units such as a control unit. The ALU may be coupled to the control unit. The ALU may be operable to perform one or more mathematical and logical operations. The control unit may be configured to control the operation of the ALU.

In an embodiment, the processor 202 may be configured to generate the data structure, based on the aggregation of the crowd-sensed data received from the one or more data sources. Further, the count of rows in the data structure may be determined based on the count of the one or more data sources. Further, the count of columns in the data structure may be determined based on the type of each of the one or more events associated with the one or more event reports in the crowd-sensed data. In an embodiment, the processor 202 may be configured to determine the score of each cell, which may correspond to a specific data source represented by a row and a specific event type represented by a column, in the data structure. The determination of the score is based on the reputation score of the specific data source and the number of times the specific event in each of the one or more events 112 is reported by the one or more data sources (i.e., a count of one or more event reports associated with the specific type of event).

In an embodiment, the processor 202 may be configured to determine the first information and the second information based on at least the data structure, the reputation score associated with each of the one or more data sources and the metadata associated with each of the one or more event reports. Further, the processor 202 may be configured to determine the veracity of the one or more event reports based on the first information and the second information. In an embodiment, the processor 202 may be further configured to determine the likelihood of the occurrence of the one or more other events based on the first information and the second information.

The memory 204 may be operable to store one or more machine codes, and/or computer programs having at least one code section executable by the processor 202. The memory 204 may store one or more sets of instructions that are executable by the processor 202, the I/O unit 206, the aggregator 208, the reputation computation processor 210, and the transceiver 212. In an embodiment, the memory 204 may include one or more buffers (not shown). The one or more buffers may store the metadata associated with the one or more event reports. Some of the commonly known memory implementations include, but are not limited to, a random access memory (RAM), a read-only memory (ROM), a hard disk drive (HDD), and a secure digital (SD) card. In an embodiment, the memory 204 may include the one or more machine codes, and/or computer programs that are executable by the processor 202 to perform specific operations. It will be apparent to a person having ordinary skill in the art that the one or more instructions stored in the memory 204 enable the hardware of the system 200 to perform the predetermined operation.

The I/O unit 206 may comprise suitable logic, circuitry, interfaces, and/or code that may be configured to receive an input from the one or more user-computing devices 102 and transmit an output to the requestor-computing device 108.

The I/O unit 206 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

The aggregator 208 includes suitable logic, circuitry, and/or interfaces that are configured to execute the one or more sets of instructions stored in the memory 204. The aggregator 208 may be configured to aggregate the crowd-sensed data received from the one or more data sources. In an embodiment, the aggregator 208 may aggregate the crowd-sensed data based on the type of event associated with each of the one or more event reports. In an embodiment, the aggregator 208 may aggregate the crowd-sensed data based on at least the reporting time stamp associated with each of the one or more event reports. In yet another embodiment, the aggregator 208 may aggregate the crowd-sensed data based on the geographical area associated with each of the one or more events 112. The aggregator 208 may be realized through various electronic components, such as, but not limited to, a System-on-Chip (SoC) component, an ASIC component, or a field-programmable gate array (FPGA) component.

The reputation computation processor 210 includes suitable logic, circuitry, and/or interfaces that are configured to execute one or more instructions stored in the memory 204. The reputation computation processor 210 may be configured to determine the reputation score of the one or more data sources based on at least the one or more event reports on the one or more data sources in the geographical area, the veracity associated with each of the one or more event reports, the reporting time stamp associated with each of the one or more event reports, and the criticality score associated with each of the one or more events 112 associated with the one or more event reports. The reputation computation processor 210 may be implemented based on a number of processor technologies known in the art. Examples of the reputation computation processor 210 may include, but are not limited to, an X86-based processor, a RISC processor, an ASIC processor, and/or a CISC processor. The reputation computation processor 210 may comprise one or more arithmetic logic units such as an arithmetic logic unit (ALU) and one or more control units such as a control unit. The ALU may be coupled to the control unit. The ALU may be operable to perform one or more mathematical and logical operations. The control unit may be configured to control the operation of the ALU.

The transceiver 214 may be operable to communicate with the one or more devices, such as the requestor-computing device 108, and/or one or more servers, such as the database server 104 over the communication network 110. The transceiver 214 may be operable to transmit/receive the metadata to/from various components of the system environment 100. In an embodiment, the transceiver 214 is coupled to the I/O unit 206 through which the transceiver 214 may receive or transmit metadata/messages/instructions associated with the one or more events 112 in the geographical area. In an embodiment, the I/O unit 206 may be realized through, but not limited to, an antenna, an Ethernet port, an USB port or any other port that can be configured to receive and transmit data. The transceiver 214 may receive and transmit data/messages in accordance with various communication protocols such as TCP/IP, UDP, and 2G, 3G, or 4G.

Figure 3:
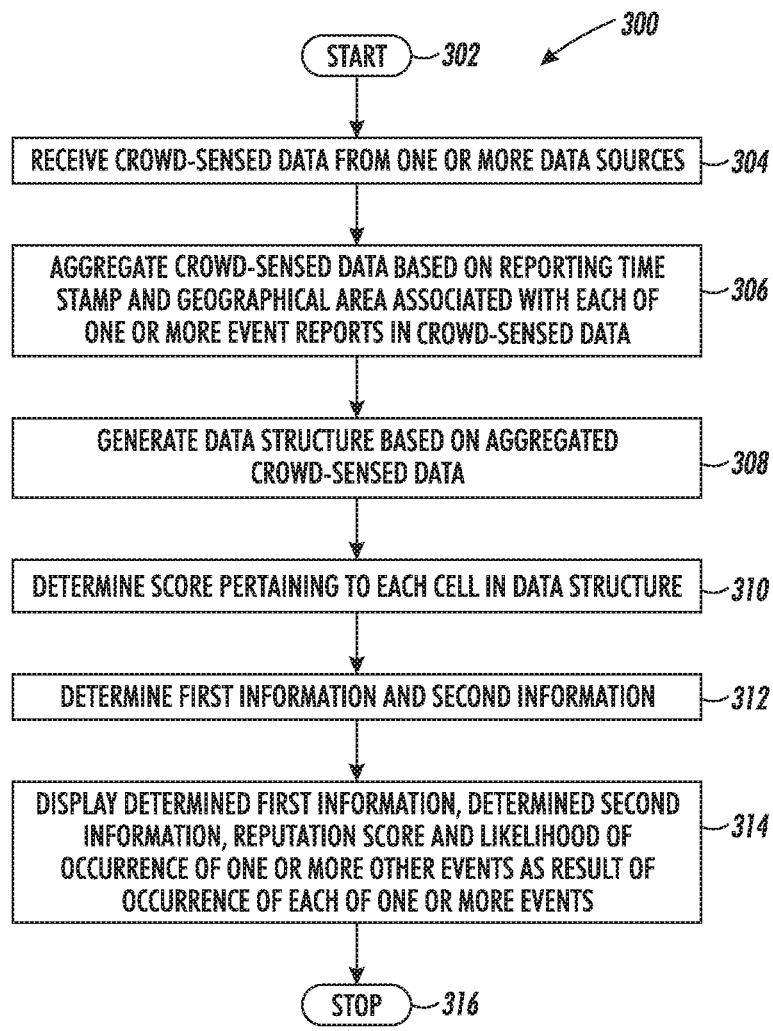
FIG. 3 is a flowchart that illustrates a method for managing crowd-sensed data, associated with events occurring in a geographical area, in accordance with at least one embodiment.

FIG. 3 is a flowchart that illustrates a method for managing crowd-sensed data, associated with events occurring in a geographical area, in accordance with an embodiment. FIG. 3 is described in conjunction with FIG. 1 and FIG. 2. FIG. 3 contains a flowchart 300 that illustrates the method for managing crowd-sensed data, associated with events occurring in the geographical area. The flowchart starts at step 302 and proceeds to step 304.

At step 304, crowd-sensed data is received from the one or more data sources. In an embodiment, the transceiver 212, in conjunction with the processor 202, may be configured to receive the crowd-sensed data from the one or more data sources. The received crowd-sensed data may comprise one or more event reports extracted from the one or more data sources. Further, the crowd-sensed data may comprise the one or more event reports pertaining to at least a type of each of the one or more events 112. In an embodiment, the one or more event reports, associated with the one or more events 112, may be posted by the one or more users by utilizing the one or more user-computing devices 102.

In an embodiment, the processor 202 may be configured to determine the metadata associated with each of the one or more event reports in the crowd-sensed data. The metadata may include the occurrence time stamp, the geographical area, and the criticality score associated with each of the one or more event reports. In an embodiment, the criticality score may be determined by the one or more users when the data pertaining to the one or more events 112 is posted on the one or more data sources. In alternate embodiment, the criticality score may be determined by the processor 202. For the determination of the criticality score, the processor 202, in conjunction with the transceiver 212, may query the database server 104 for the retrieval of historical data. Thereafter, the processor 202 may utilize the one or more event reports pertaining to the one or more previous events in the historical data to determine the criticality score. The processor 202 may determine a higher criticality score of each of the one or more event reports associated with a first event that is more critical than a second event.

In an exemplary scenario, the crowd-sensed data received by the processor 202 may comprise 50 event reports pertaining to the one or more events 112, such as "road blockage," "fire," and "water leakage." Of the 50 event reports, 15 event reports may be associated with a "fire accident at Madison avenue at 10:00 am on Aug. 21, 2015," 17 event reports may be associated with a "traffic jam at East Harlem at 1:00 pm on Aug. 22, 2015," and 12 event reports may be associated with a "water leakage at East Harlem at 12:45 pm on Aug. 22, 2015." The processor 202 may further determine the metadata associated with each of the 50 event reports, such as "10:00 am on Aug. 21, 2015" (i.e., the occurrence time stamp) and "Madison avenue" (i.e., the geographical location). Further, the processor 202 may determine a higher criticality score of the 15 event reports associated with the "fire accident" than that of the 17 event reports associated with the "traffic jam" and the 12 event reports associated with the "water leakage" based on the historical data.

A person having ordinary skill in the art will understand that the abovementioned exemplary scenario is for illustrative purposes and should not be construed to limit the scope of the disclosure.

At step 306, the received crowd-sensed data is aggregated based on the reporting time stamp and the geographical area associated with each of the one or more event reports in the crowd-sensed data. In an embodiment, the aggregator 208, in conjunction with the processor 202, may be configured to aggregate the received crowd-sensed data based on the reporting time stamp and the geographical area associated with each of the one or more event reports in the crowd-sensed data. In an embodiment, the aggregator 208 may further aggregate the crowd-sensed data based on the type of event associated with each of the one or more event reports in the crowd-sensed data.

The aggregator 208 may utilize one or more aggregation algorithms, known in the art, for aggregation of the crowd-sensed data. In an embodiment, the one or more event reports pertaining to a common event of the one or more events may be grouped together. In an embodiment, the aggregator 208 may utilize the reporting time stamp, the geographical area, and the content of the one or more event reports to identify the one or more event reports that are associated with the common event. For example, the aggregator 208 may determine that an event report, such as "27 people injured in a fire breakout at Madison avenue at 10:00 am" and another event report, such as "the cause of the fire accident at Madison avenue at 10:00 am remains unidentified" correspond to a common event "fire accident" that occurred at a geographical location "Madison avenue." Thus, the aggregator 208 may aggregate the two event reports together.

A person having ordinary skill in the art will understand that the abovementioned example is for illustrative purposes and should not be construed to limit the scope of the disclosure.

At step 308, the data structure is generated based on the aggregated crowd-sensed data. In an embodiment, the processor 202 may be configured to generate the data structure based on the aggregated crowd-sensed data. In an embodiment, the data structure may comprise a plurality of rows and a plurality of columns. Further, the plurality of rows may be determined based on the one or more data sources and the plurality of columns may be determined based on the type of each of the one or more events 112. Further, the count of the plurality of rows is equal to the count of the one or more data sources from which the crowd-sensed data is received. Further, the count of the plurality of columns is equal to the count of the type of each of the one or more events 112. For example, the processor 202 may determine six different types of the one or more events 112 in aggregated crowd-sensed data. Thus, the processor 202 may determine six columns in the data structure. Similarly, the processor 202 may have received the crowd-sensed data from eight data sources. Thus, the processor 202 determines eight rows in the data structure.

In an exemplary implementation, the data structure may correspond to a two-dimensional matrix SC. The count of the plurality of rows in the matrix SC depends on the count of the one or more data sources and the count of plurality of columns depends on the count of types of the one or more events 112 in the aggregated crowd-sensed data. Further, the matrix SC comprises a plurality of cells. Each of the plurality of cells in the matrix SC corresponds to a specific data source represented by a row and a specific type of event represented by a column. The count of plurality of cells is a product of the count of the plurality of rows and the plurality of columns in the matrix SC. A cell SC(i,j) represents a number of event reports pertaining to $j^{th}$ type of event received from $i^{th}$ data source. For instance, the $j^{th}$ type of event may be "Traffic jam at Whitefield" and the $i^{th}$ data source may be "Traffline." The processor 202 may receive 10 event reports from the $i^{th}$ data source "Traffline" for the $j^{th}$ type of event "Traffic Jam at Whitefield," thus SC(i,j)=10. In other scenario, the processor 202 may not receive any event report from the $i^{th}$ data source "Traffline" for the $j^{th}$ type of event "Traffic Jam at Whitefield," thus SC(i,j)=0. In an embodiment, the processor 202 may be configured to update the matrix after a pre-defined interval T.

At step 310, the score pertaining to each of the plurality of cells in the matrix SC is determined. In an embodiment, the processor 202, in conjunction with the reputation computation processor 210, may determine the score pertaining to each of the plurality of cells in the matrix SC. In an embodiment, the processor 202 may determine the score pertaining to each cell in the plurality of cells of the matrix SC based on the reputation score of the specific data source associated with the corresponding cell and/or a number of times the specific event in each of the one or more events 112 (i.e., the count of the one or more event reports associated with the specific type of event) is reported by the one or more data sources.

In an embodiment, the reputation computation processor 210 may be configured to determine the reputation score of each of the one or more data sources. In an embodiment, the reputation computation processor 210 may determine the reputation score of each of the one or more data sources based on the one or more event reports on the one or more data sources, the veracity associated with each of the one or more event reports, the reporting time stamp associated with each of the one or more event reports, and the criticality score associated with each of the one or more event reports. For example, the reputation computation processor 210 may determine a high reputation for a data source that comprises one or more event reports pertaining to a more critical event than for another data source that comprises one or more event reports pertaining to a less critical event. In an embodiment, the reputation computation processor 210 may further utilize the historical data for the determination of the reputation score of each of the one or more data sources and the veracity associated with each of the one or more event reports.

After the determination of the reputation score of each of the one or more data sources, the processor 202 may determine the score of each cell in the plurality of cells of the data structure. In an embodiment, the score of each of the plurality of cells may correspond to a value between 0 and 1. In an embodiment, the determined score associated with a specific data source and a specific event may represent a probability according to the specific data source and the occurrence of the specific event. In another embodiment, the determined score associated with a specific data source and a specific event may represent a normalized count of event reports, associated with the specific event, received from the specific data source.

At step 312, the first information and the second information are determined. In an embodiment, the processor 202 may be configured to determine the first information and the second information. In an embodiment, the processor 202 may utilize the data structure for the determination of the first information and the second information. In an embodiment, the processor 202 may further utilize the likelihood of occurrence of the one or more other events that occur as a result of the occurrence of each of the one or more events 112 for the determination of the first information and the second information. For example, an event "road accident" may result in the occurrence of another event "road blockage."

In an embodiment, the processor 202 may further utilize the reporting time stamp associated with each of the one or more event reports, the criticality score associated with each of the one or more event reports, and the pre-determined category of the one or more data sources for determining the second information (i.e., the data source reliability score). For example, the processor 202 may determine a high data source reliability score for a data source associated with a government agency (i.e., an instance of the pre-determined category) than for a data source associated with an individual (i.e., another instance of the pre-determined category).

In an embodiment, the processor 202 may utilize a maximization algorithm, such as expectation maximization algorithm, known in the art, for the determination of the first information and the second information.

In an exemplary implementation of the expectation maximization algorithm, the processor 202 may utilize equations (1) and (2) as shown below, for the determination of the first information and the second information:

$$L(\theta; SC, Z) = \qquad (1)$$

$$p(SC, Z \mid \theta) = \prod_{j=1}^{N} \left\{ \prod_{i=1}^{M} \left( \frac{n_{ij}}{k_{ij}} \right) a_i^{k_{ij}} (1-a_i)^{(n_{ij}-k_{ij})} \times d_j \times Z_j + \prod_{j=1}^{M} \left( \frac{n_{ij}}{k_{ij}} \right) b_i^{k_{ij}} (1-b_i)^{(n_{ij}-k_{ij})} \times (1-d_j) \times (1-z_j) \right.$$

$$E_Z \mid SC, \qquad (2)$$

$$\theta [\log L(\theta; SC, Z)] = \sum_{j=1}^{N} \left\{ p(Z_j = 1 \mid SC, \theta) \times \left[ \sum_{i=1}^{M} k_{ij} \log a_i + (n_{ij} - k_{ij}) \log(1-a_i) + \log d_j \right] + p(Z_j = 0 \mid SC, \theta) \times \left[ \sum_{i=1}^{M} k_{ij} \log b_i + (n_{ij} - k_{ij}) \log(1-b_i) + \log(1-d_j) \right] \right\}$$

where,

SC represents the data structure comprising M data sources and N event types;

Z represents the first information (i.e., a vector of binary variables $[z_1\ z_2]$), where $Z_j=1$ if a $j^{th}$ event in the data structure SC is true, else 0;

$d_j$ represents a prior probability of occurrence of the $j^{th}$ event determined based on the historical data;

$a_i$ represents a probability that the one or more event reports in the $i^{th}$ data source are true, (i.e., $P(S_iC_j=1|C_j=\text{true})$. In an embodiment, the processor 202 may determine $a_i$ based on the reputation score (i.e., $$\varphi_{dyn(i)} = \frac{\sum_{t=1}^{T} (a_i^t + 1)\lambda^{(T-t)}}{a_i^t + b_i^t + 2},$$

at time t of $i^{th}$ data source, determined based on the historical data over a time period T with $0<\lambda<1$ and the veracity associated with each of the one or more event reports of the $i^{th}$ data source. In an embodiment, the processor 202 may determine an initial value for $a_i$ based on the historical data;

$b_i$ represents a probability that the one or more event reports in the $i^{th}$ data source are false, (i.e., $P(S_iC_j=1|C_j=\text{false})$. In an embodiment, the processor 202 may determine $b_i$ based on the reputation score (i.e., $$\varphi_{dyn(i)} = \frac{\sum_{t=1}^{T}(a_i^t+1)\lambda^{(T-t)}}{a_i^t+b_i^t+2},$$

at time t of $i^{th}$ data source, determined based on the historical data over a time period T with $0<\lambda<1$ and the veracity associated with each of the one or more event reports of the $i^{th}$ data source. In an embodiment, the processor 202 may determine an initial value for $b_i$ based on the historical data;

θ represents a set $[a_1, a_2, a_3, \ldots, a_m; b_1, b_2, b_3, \ldots, b_m]$ that correspond to the second information;

$n_{ij}$ and $k_{ij}$ represent indices of binomial coefficient associated with $p(S_iC_j, Z_j | a_i, b_i);$ $p(Z_j = 1 | SC, \theta) = Z(j) = \frac{A(j) \times d_j}{A(j) \times d_j + B(j) \times (1-d_i)};$ $A(j) = p(SC_j, \theta | Z_j = 1) = \prod_{i=1}^{M}\binom{n_{ij}}{k_{ij}}a_i^{k_{ij}}(1-a_i)^{n_{ij}-k_{ij}};$ and $B(j) = p(SC_j, \theta | Z_j = 0) = \prod_{i=1}^{M}\binom{n_{ij}}{k_{ij}}b_i^{k_{ij}}(1-b_i)^{n_{ij}-k_{ij}}$ The processor 202 may further update the values of $a_i$ and $b_i$, based on the equation (3) and (4), as shown below, respectively:

$$a_i^* = \frac{\sum_{j \in sc_i}k_{ij}Z(j)}{\sum_{j=1}^{N}n_{ij}Z(j)} \tag{3}$$

$$b_i^* = \frac{\sum_{j \in sc_i}k_{ij}(1-Z(j))}{\sum_{j=1}^{N}n_{ij}(1-Z(j))} \tag{4}$$

In another embodiment, the processor 202 may further update the values of $a_i$ and $b_i$, based on the reputation score of $i^{th}$ data source by using equations (5) and (6), as shown below:

$$a_i^* = \frac{\sum_{j \in sc_i}\varphi(i,j)*k_{ij}*Z(j)}{\sum_{j=1}^{N}\varphi(i,j)n_{ij}*Z(j)} \tag{5}$$

$$b_i^* = \frac{\sum_{j \in sc_i}\varphi(i,j)*k_{ij}*(1-Z(j))}{\sum_{j=1}^{N}\varphi(i,j)n_{ij}*(1-Z(j))} \tag{6}$$

After the values of $a_i$ and $b_i$ are updated, the processor 202 may further iteratively determine the first information and the second information by utilizing the equations (1) and (2) until the first information and the second information converge, where $R(i,j)=Z(j)*\alpha_1+(1-Z(j))*(1-b_i)$ represents the converged value of the second information.

In an embodiment, the first information determined by the processor 202 may correspond to the likelihood of the occurrence of each of the one or more events 112 and the second information may correspond to the data source reliability score. In an embodiment, the processor 202 may further utilize the determined first information and the second information to update the reputation score of each of the one or more data sources.

In another embodiment, the processor 202 may further determine the second information (i.e., the data source reliability score of each of the one or more data sources) based on a priority weight associated with each of the one or more types of events. The processor 202 may utilize equation (7), as shown below, to determine the prioritized second information (i.e., $R_i$) for the $i^{th}$ data source:

$$R_i = \sum_{j=1}^{N} w_j * R(i,j) \tag{7}$$

where, $w_j$ represents the priority weight of a $j^{th}$ type of event.

In another exemplary implementation, the processor 202 may further determine the first information and the second information based on the likelihood of occurrence of the one or more other events as a result of the occurrence of each of the one or more events 112 by utilizing equations (8) and (9), as shown below:

$$L(\theta; SC, Z) = \prod_{\forall j} p(SC_j, Z_j | \theta_{z_k: \forall k \in 1:N}) \tag{8}$$

$$Z(j) = \frac{A(j) \times d'_j}{A(j) \times d'_j + B(j) \times (1-d'_j)} \tag{9}$$

where, $d'_j$ represents a conditional probability of occurrence of $j^{th}$ event as a result of the occurrence of the one or more other events.

A person having ordinary skill in the art will understand that the abovementioned exemplary scenarios are for illustrative purposes and should not be construed to limit the scope of the disclosure.

At step 314, the determined first information, the determined second information, the reputation score, and the likelihood of the occurrence of one or more events as a result of the occurrence of each of the one or more events 112 may be displayed. In an embodiment, the processor 202 may be configured to display the first information Z(j), the second information R(i,j) (or $R_i$), the updated reputation score $\varphi_{dyn(i)}$, and the likelihood of the occurrence of one or more other events as a result of the occurrence of each of the one or more events 112 on the requestor-computing device 108, through the user interface. In an embodiment, the processor 202 may be configured to display the first information Z(j), the second information R(i,j) (or $R_i$), the updated reputation score $\varphi_{dyn(i)}$, and the likelihood of the occurrence of one or more events as a result of the occurrence of each of the one or more events 112 on the requestor-computing device 108 based on the request received from the requestor. The requestor may transmit the request by utilizing the requestor-computing device 108.

In an embodiment, the request received from the requestor-computing device 108 may comprise one or more preferences of the requestor. The one or more preferences may include a set of pre-determined tags from one or more pre-determined tags associated with the types of the one or more events, the set of data sources from the one or more data sources from which the requestor may want to view the first information and the second information, and/or a location of interest. In a scenario, a requestor, who is a traffic in-charge, may only be interested in traffic-related events. Thus, the requestor may provide a set of pre-determined tags such as "traffic jams," "road accident," "road construction," and/or the like, associated with the type of traffic-related events in the request. In another scenario, a requestor may transmit a request comprising a set of two data sources, such as "Mycity" and "Traffiline." In this scenario, the first information and the second information pertaining to the set of two data sources, "Mycity" and "Traffiline," are displayed to the requestor.

A person having ordinary skill in the art will understand that the abovementioned examples are for illustrative purposes and should not be construed to limit the scope of the disclosure.

Thereafter, based on the received request, the processor 202 may transmit the corresponding first information $Z(j)$, the second information $R(i,j)$ (or $R_i$), the updated reputation score $\varphi_{dyn(i)}$, and the likelihood of the occurrence of the one or more events as a result of the occurrence of each of the one or more events 112 to the requestor-computing device 108.

In a scenario, when the request comprises a set of data sources from the one or more data sources, the processor 202 may be configured to select a subset of the data structure comprising rows pertaining to the set of data sources. Further, the processor 202 may utilize equation (1) to (9) for determining the first information $Z(j)$, the second information $R(i,j)$ (or $R_i$), the updated reputation score $\varphi_{dyn(i)}$, and the likelihood of the occurrence of one or more events 112 as a result of the occurrence of each of the one or more events 112 corresponding to the subset of data structure.

In an embodiment, the processor 202 may be configured to prioritize the display of the first information $Z(j)$, the second information $R(i,j)$ (or $R_i$), the updated reputation score $\varphi_{dyn(i)}$, and the likelihood of the occurrence of one or more other events as a result of the occurrence of each of the one or more events 112 on the requestor-computing device 108. In an embodiment, the processor 202 may prioritize the display based on the location of interest specified by the requestor. In a certain scenario, the processor 202 may prioritize the display in a way that the likelihood of the occurrence of each of the one or more other events 112 (i.e., the first information) associated with the location of interest are displayed before the likelihood of the one or more events that are not associated with the location of interest.

A person having ordinary skill in the art will understand that the scope of the disclosure is not limited to the display of the first information in a prioritized manner. In another embodiment, the processor 202 may further prioritize the display of the second information, the reputation score, and the likelihood of the occurrence of one or more other events as a result of the occurrence of each of the one or more events 112.

Figure 4:
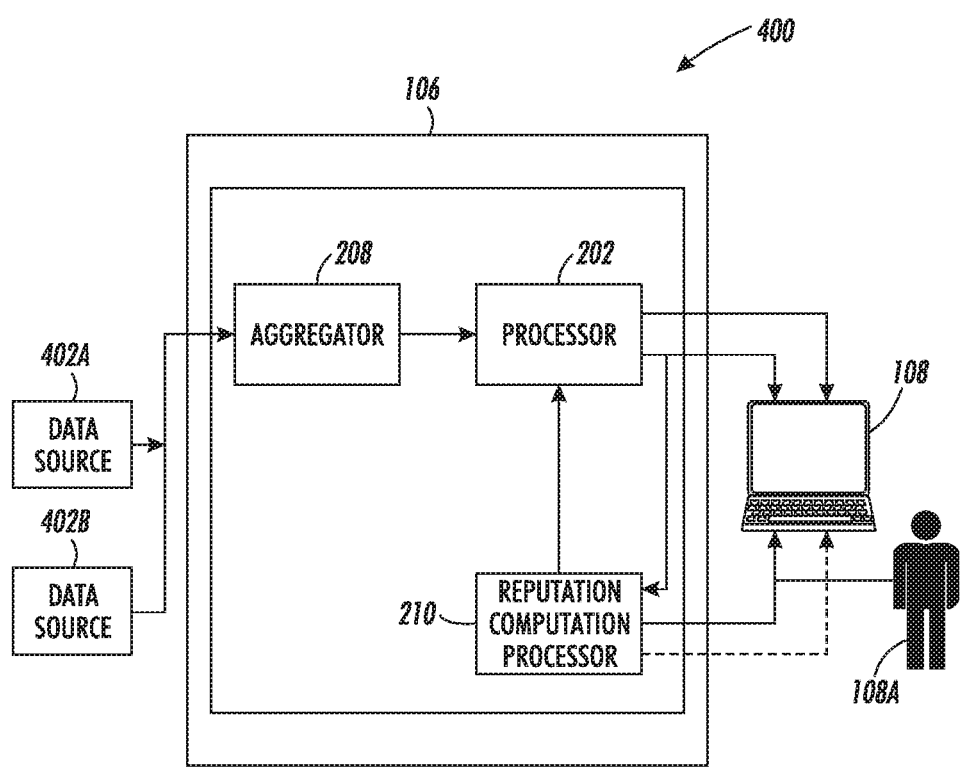
FIG. 4 is an exemplary scenario for managing crowd-sensed data, associated with events occurring in a geographical area, in accordance with at least one embodiment.

FIG. 4 is an exemplary scenario for managing crowd-sensed data, associated with events occurring in a geographical area, in accordance with at least one embodiment. FIG. 4 has been described in conjunction with FIGS. 1-3. FIG. 4 contains an exemplary scenario 400 for management of the crowd-sensed data associated with the one or more events 112 occurring in the geographical area.

The one or more users associated with the one or more user-computing devices 102 may post data (i.e., the one or more event reports) pertaining to the one or more events 112 on the one or more data sources 402A and 402B. Thereafter, the application server 106 may be configured to manage the crowd-sensed data (i.e., the one or more event reports).

For managing the crowd-sensed data, the transceiver 212 may receive the crowd-sensed data comprising the one or more event reports extracted from the one or more data sources 402A and 402B. Further, the aggregator 208 may aggregate the received crowd-sensed data based on at least the reporting time stamp and the geographical area associated with each of the one or more event reports in the crowd-sensed data. Thereafter, the processor 202 may generate the data structure based on the aggregated crowd-sensed data. Further, the count of rows in the data structure is determined based on the count of the one or more data sources 402A and 402B and the count of columns in the generated data structure is determined based on the count of the types of each of the one or more events 112. Thereafter, the processor 202 may determine the score pertaining to each cell, that corresponds to a specific data source represented by a row and a specific event represented by a column, in the data structure based on the reputation score of the specific data source and the number of times the specific event in each of the one or more events 112 is reported by the one or more users on the one or more data sources. In an embodiment, the reputation computation processor 210 may retrieve the historical data from the database server 104 for the determination of the initial value of the reputation score of each of the one or more data sources 402A and 402B. The reputation computation processor 210 may further utilize the one or more event reports, the veracity, the second time stamp, and the criticality score associated with each of the one or more event reports for the determination of the initial value of the reputation score of each of the one or more data sources 402A and 402B.

Thereafter, the processor 202 may utilize the data structure and the initial value of the reputation score for the determination of the first information and the second information. In an embodiment, the processor 202 may further utilize the likelihood of occurrence of the one or more other events as a result of the occurrence of the one or more events 112 for the determination of the first information and the second information. In an embodiment, the processor 202 may utilize one or more maximization algorithms, such as the expectation maximization algorithm, known in the art for the determination of the first information and the second information. Thereafter, based on the first information and the second information, the reputation computation processor 210 may update the reputation score of each of the one or more data sources 402A and 402B.

In an embodiment, the transceiver 212 may receive the request from the requestor associated with the requestor-computing device 108 for the display of the first information, the second information, the reputation score, and the likelihood of the occurrence of the one or more other events as a result of the occurrence of the one or more events 112, such as "traffic jams," "vehicle detours," "road accidents," and "rash driving." In an embodiment, the requestor may further request to view the first information, the second information, the reputation score, and the likelihood of the occurrence of the one or more other events as a result of the occurrence of the one or more events 112 based on the one or more event reports associated with the data source 402A.

Thereafter, based on the received request, the processor 202 may display the first information, the second information, the reputation score, and the likelihood of the occurrence of one or more other events as a result of the occurrence of the one or more events 112 in a prioritized order on the requestor-computing device 108, through the user interface.

The disclosed embodiments encompass numerous advantages. The method may be utilized for crowd-sensed data management, associated with events occurring in a geographical area. The method may be used to determine the veracity of one or more events reported by one or more data sources in a geographical area. Further, the disclosed method may be utilized to determine the criticality of the one or more events in the geographical area. The disclosed method may further be used to determine the likelihood of occurrence of one or more other events due to an occurrence of each of the one or more events. The disclosed method provides a robust, automatic, and dynamic means for managing crowd-sensed data. The disclosed method may be utilized by one or more service providers, such as "traffic management authorities," "law and order management authorities," and/or the like, for obtaining organized information pertaining to one or more relevant events.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, and the like. The storage device may also be a means for loading computer programs or other instructions into the computer system. The computer system also includes a communication unit. The communication unit allows the computer to connect to other databases and the Internet through an input/output (I/O) interface, allowing the transfer as well as reception of data from other sources. The communication unit may include a modem, an Ethernet card, or other similar devices, which enable the computer system to connect to databases and networks, such as, LAN, MAN, WAN, and the Internet. The computer system facilitates input from a user through input devices accessible to the system through an I/O interface.

In order to process input data, the computer system executes a set of instructions that are stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or using only hardware or by a varying combination of the two techniques. The disclosure is independent of the programming language and the operating system used in the computers. The instructions for the disclosure can be written in all programming languages including, but not limited to, "C," "C++," "Visual C++," Java, and "Visual Basic." Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms including, but not limited to, "Unix," "DOS," "Android," "Symbian," and "Linux."

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for managing crowd-sensed data, associated with events occurring in a geographical area have been disclosed. However, it should be apparent to those skilled in the art that modifications in addition to those described, are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, or the like.

The claims can encompass embodiments for hardware, software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for managing crowd-sensed data, associated with events occurring in a geographical area, at a computing device, said method comprising:

receiving, by one or more transceivers at the computing device, the crowd-sensed data from one or more data sources, wherein the crowd-sensed data comprises one or more event reports associated with at least a type of each of one or more events reported by the one or more data sources and a particular geographical area associated with the one or more events, and wherein the crowd-sensed data is received in real-time;

generating, by one or more processors at the computing device, a data structure based on an aggregation of the received crowd-sensed data;

determining, by the one or more processors at the computing device, first information and second information based on at least the generated data structure, a reputation score associated with each of the one or more data sources and metadata associated with each of the one or more event reports, wherein the first information corresponds to a likelihood of an occurrence of one or more other events at the particular geographical area, and wherein the first information is determined using:

$$Z(j) = \frac{A(j) \times d'_j}{A(j) \times d'_j + B(j) \times (1 - d'_j)};$$

and displaying, by the one or more processors at the computing device, at least the determined first information and the determined second information through a user interface displayed on a display screen of a requestor-computing device based on at least a prioritization of the one or more events, wherein the one or more other events occur as a direct result of the occurrence of the one or more events, wherein the one or more other events correspond to traffic-related events, and wherein the traffic-related events include one or more of traffic jams, vehicle detours, and road accidents.

2. The method of claim 1, wherein the crowd-sensed data corresponds to one or more electronic messages posted, shared, liked, or disliked by one or more users, associated with the one or more data sources, pertaining to each of the one or more events.

3. The method of claim 1, wherein the crowd-sensed data further includes at least an occurrence time stamp associated with each of the one or more event reports and the geographical area associated with each of the one or more event reports.

4. The method of claim 1, wherein the received crowd-sensed data is aggregated based on at least a reporting time stamp and the geographical area associated with each of the one or more event reports in the crowd-sensed data.

5. The method of claim 1, wherein a count of rows in the generated data structure is determined based on the one or more data sources, and wherein a count of columns in the generated data structure is determined based on the type of each of the one or more events.

6. The method of claim 5, further comprising determining, by the one or more processors, a score pertaining to each cell, that corresponds to a specific data source represented by a row and a specific event represented by a column, in the generated data structure based on the reputation score of the specific data source and a number of times the specific event in each of the one or more events is reported by one or more users on the one or more data sources.

7. The method of claim 6, wherein the reputation score of a data source is determined based on at least one or more event reports in the data source, a veracity associated with each of the one or more event reports, a reporting time stamp associated with each of the one or more event reports, and a criticality score associated with each of the one or more events.

8. The method of claim 7, wherein the veracity associated with each of the one or more event reports is based on the first information and the second information.

9. The method of claim 7, wherein the criticality score of each of the one or more events is based on at least historical data associated with each of the one or more events.

10. The method of claim 1, wherein the first information is determined based on one or more preferences of a requestor for each of the one or more events.

11. The method of claim 1, wherein the determined second information corresponds to a data source reliability score that is determined based on a reporting time stamp associated with each of the one or more event reports, a criticality score associated with each of the one or more event reports, a pre-determined category of the one or more data sources, and/or a likelihood of occurrence of one or more other events due to the occurrence of each of the one or more events.

12. The method of claim 1, wherein the metadata associated with each of the one or more event reports comprises an occurrence time stamp associated with each of the one or more event reports, a geographical location associated with each of the one or more event reports, and a criticality score associated with each of the one or more events.

13. The method of claim 1, wherein the aggregation is based on at least the one or more data sources and the type of each of the one or more events associated with the crowd-sensed data.

14. The method of claim 1, further comprising displaying, by the one or more processors, the reputation score and a likelihood of occurrence of one or more other events as result of the occurrence of each of the one or more events on the display screen of the computing device of a requestor.

15. The method of claim 1, wherein the prioritization of each of the one or more events is determined based on a criticality score of each of the one or more events.

16. A system for managing crowd-sensed data, associated with events occurring in a geographical area, at a computing device, said system comprising:

one or more transceivers at the computing device configured to:

receive the crowd-sensed data from one or more data sources, wherein the crowd-sensed data comprises one or more event reports associated with at least a type of each of one or more events reported by the one or more data sources and a particular geographical area associated with the one or more events, and wherein the crowd-sensed data is received in real-time;

one or more processors at the computing device configured to:

generate a data structure based on an aggregation of the received crowd-sensed data;

determine first information and second information based on at least the generated data structure, a reputation score associated with each of the one or more data sources and metadata associated with each of the one or more event reports, wherein the first information corresponds to a likelihood of an occurrence of one or more other events at the particular geographical area, and wherein the first information is determined using:

$$Z(j) = \frac{A(j) \times d'_j}{A(j) \times d'_j + B(j) \times (1-d'_j)};$$

and
display at least the determined first information and the determined second information through a user interface displayed on a display screen of a requestor-computing device based on at least a prioritization of the one or more events,
wherein the one or more other events occur as a direct result of the occurrence of the one or more events,
wherein the one or more other events correspond to traffic-related events, and
wherein the traffic-related events include one or more of traffic jams, vehicle detours, and road accidents.

17. The system of claim 16, wherein the crowd-sensed data corresponds to one or more electronic messages posted, shared, liked, or disliked by one or more users, associated with the one or more data sources, pertaining to each of the one or more events.

18. The system of claim 16, wherein the crowd-sensed data further includes at least an occurrence time stamp associated with each of the one or more event reports and the geographical area associated with each of the one or more event reports.

19. The system of claim 16, wherein said one or more processors are further configured to aggregate the received crowd-sensed data based on at least a reporting time stamp and the geographical area associated with each of the one or more event reports in the crowd-sensed data.

20. The system of claim 16, wherein a count of rows in the generated data structure is determined based on the one or more data sources and wherein a count of columns in the generated data structure is determined based on the type of each of the one or more events.

21. The system of claim 20 further comprising determining, by the one or more processors, a score pertaining to each cell, that corresponds to a specific data source represented by a row and a specific event represented by a column, in the generated data structure based on the reputation score of the specific data source and a number of times the specific event in each of the one or more events is reported by one or more users on the one or more data sources.

22. The system of claim 21, wherein said one or more processors are further configured to determine the reputation score of a data source based on at least one or more event reports in the data source, a veracity associated with each of the one or more event reports, a second time stamp associated with each of the one or more event reports and a criticality score associated with each of the one or more events based on at least historical data associated with each of the one or more events.

23. The system of claim 22, wherein the veracity associated with each of the one or more event reports is based on the first information and the second information.

24. The system of claim 16, wherein the first information is determined based on one or more preferences of a requestor for each of the one or more events and the determined second information corresponds to a data source reliability score that is determined based on a reporting time stamp associated with each of the one or more event reports, a criticality score associated with each of the reported one or more events, and a pre-determined category of the one or more data sources and/or the likelihood of occurrence of one or more other events due to the occurrence of each of the one or more events.

25. The system of claim 16, wherein the metadata associated with each of the one or more events comprises of an occurrence time stamp associated with each of the one or more event reports, a geographical location associated with each of the one or more event reports, and a criticality score associated with each of the one or more events.

26. The system of claim 16, further comprising displaying, by the one or more processors, the reputation score and a likelihood of occurrence of one or more other events as a result of the occurrence of each of the one or more events on the display screen of the computing device of a requestor.

27. A computer program product for use with a computer, the computer program product comprising a non-transitory computer readable medium, wherein the non-transitory computer readable medium stores a computer program code for managing crowd-sensed data, associated with events occurring in a geographical area, at a computing device, wherein the computer program code is executable by one or more processors to:
receive the crowd-sensed data from one or more data sources, wherein the crowd-sensed data comprises one or more event reports associated with at least a type of each of one or more events reported by the one or more data sources and a particular geographical area associated with the one or more events, and wherein the crowd-sensed data is received in real-time;
generate a data structure based on an aggregation of the received crowd-sensed data;
determine first information and second information based on at least the generated data structure, a reputation score associated with each of the one or more data sources and metadata associated with each of the one or more event reports, wherein the first information corresponds to a likelihood of an occurrence of one or more other events at the particular geographical area, and wherein the first information is determined using:

$$Z(j) = \frac{A(j) \times d'_j}{A(j) \times d'_j + B(j) \times (1-d'_j)};$$

and
display at least the determined first information and the determined second information through a user interface displayed on a display screen of a requestor-computing device based on at least a prioritization of the one or more events,
wherein the one or more other events occur as a result of the occurrence of the one or more events,
wherein the one or more other events correspond to traffic-related events, and
wherein the traffic-related events include one or more of traffic jams, vehicle detours, and road accidents.

* * * * *